(12) United States Patent
Dou et al.

(10) Patent No.: US 7,111,451 B2
(45) Date of Patent: Sep. 26, 2006

(54) NO$_x$ ADSORBER DIAGNOSTICS AND AUTOMOTIVE EXHAUST CONTROL SYSTEM UTILIZING THE SAME

(75) Inventors: Danan Dou, Tulsa, OK (US); Owen H. Bailey, Lake Orion, MI (US)

(73) Assignee: Delphi Technologies, Inc., Troy, MI (US)

( * ) Notice: Subject to any disclaimer, the term of this patent is extended or adjusted under 35 U.S.C. 154(b) by 30 days.

(21) Appl. No.: 10/943,062

(22) Filed: Sep. 16, 2004

(65) Prior Publication Data

US 2006/0053772 A1    Mar. 16, 2006

(51) Int. Cl.
*F01N 3/00*   (2006.01)
*F01N 3/10*   (2006.01)

(52) U.S. Cl. .................. 60/285; 60/276; 60/295; 60/300

(58) Field of Classification Search .................. 60/276, 60/282, 284, 285, 295, 299, 300
See application file for complete search history.

(56) References Cited

U.S. PATENT DOCUMENTS

| | | | |
|---|---|---|---|
| 4,703,619 A | 11/1987 | Chujo et al. .................. 60/274 |
| 4,854,124 A | 8/1989 | Tamura ........................ 60/274 |
| 5,088,281 A | 2/1992 | Izutani et al. ................. 60/274 |
| 5,115,639 A | 5/1992 | Gopp .......................... 60/274 |
| 5,157,920 A | 10/1992 | Nakaniwa ..................... 60/274 |
| 5,224,347 A | 7/1993 | Yakabe et al. ................. 60/274 |
| 5,255,512 A | 10/1993 | Hamburg et al. .............. 60/274 |
| 5,280,707 A | 1/1994 | Nakashima et al. ........... 60/274 |
| 5,361,582 A | 11/1994 | Uchida et al. ................. 60/276 |
| 5,388,406 A | 2/1995 | Takeshima et al. ............ 60/297 |
| 5,402,641 A | 4/1995 | Katoh et al. ................... 60/285 |
| 5,437,153 A | 8/1995 | Takeshima et al. ............ 60/276 |
| 5,473,887 A * | 12/1995 | Takeshima et al. ............ 60/276 |
| 5,483,795 A | 1/1996 | Katoh et al. ................... 60/276 |
| 5,577,382 A | 11/1996 | Kihara et al. .................. 60/276 |
| 5,713,199 A | 2/1998 | Takeshima et al. ............ 60/276 |
| 5,735,119 A | 4/1998 | Asanuma et al. .............. 60/276 |
| 5,743,084 A | 4/1998 | Hepburn ....................... 60/274 |
| 5,746,049 A * | 5/1998 | Cullen et al. .................. 60/274 |
| 5,832,722 A * | 11/1998 | Cullen et al. .................. 60/274 |
| 5,842,340 A | 12/1998 | Bush et al. .................... 60/274 |
| 5,974,788 A * | 11/1999 | Hepburn et al. ............... 60/274 |
| 5,974,790 A | 11/1999 | Adamczyk et al. ............ 60/274 |
| 5,983,627 A | 11/1999 | Asik ............................. 60/274 |
| 6,003,306 A | 12/1999 | Kalversberg et al. .......... 60/274 |
| 6,041,592 A | 3/2000 | Huynh et al. .................. 60/274 |

(Continued)

*Primary Examiner*—Thomas Denion
*Assistant Examiner*—Loren Edwards
(74) *Attorney, Agent, or Firm*—Paul L. Marshall

(57) ABSTRACT

A process for controlling an exhaust system can comprise flowing exhaust gas from the engine past a first oxygen sensor, through a NO$_x$ adsorber, past a second oxygen sensor, through a catalyst and past a third oxygen sensor, wherein the first oxygen sensor, the second oxygen sensor, and the third oxygen sensor, are in operable communication with an electronic control module, and using a switching delay between the first oxygen sensor and the second oxygen sensor to determine a NO$_x$ value, wherein the NO$_x$ value is selected from the group consisting of a NO$_x$ regeneration time, a stored NO$_x$ amount, a NO$_x$ storage efficiency, and combinations comprising at least one of the foregoing NO$_x$ values. A desulfurization process can be initiated when the NO$_x$ value is less than or equal to a first selected value. During the desulfurization process, when the third oxygen sensor signals a condition rich of stoichiometry, oxygen can be provided to the catalyst.

16 Claims, 7 Drawing Sheets

U.S. PATENT DOCUMENTS

| | | |
|---|---|---|
| 6,085,518 A | 7/2000 | Yamashita et al. ............ 60/276 |
| 6,293,094 B1 * | 9/2001 | Schmidt et al. ............... 60/284 |
| 6,497,092 B1 * | 12/2002 | Theis .......................... 60/274 |
| 6,568,177 B1 * | 5/2003 | Surnilla ....................... 60/285 |
| 6,722,125 B1 * | 4/2004 | Pfalzgraf ..................... 60/295 |
| 2003/0140620 A1 * | 7/2003 | Shigapov et al. ............. 60/286 |
| 2004/0154285 A1 * | 8/2004 | Nagaoka et al. .............. 60/285 |

* cited by examiner

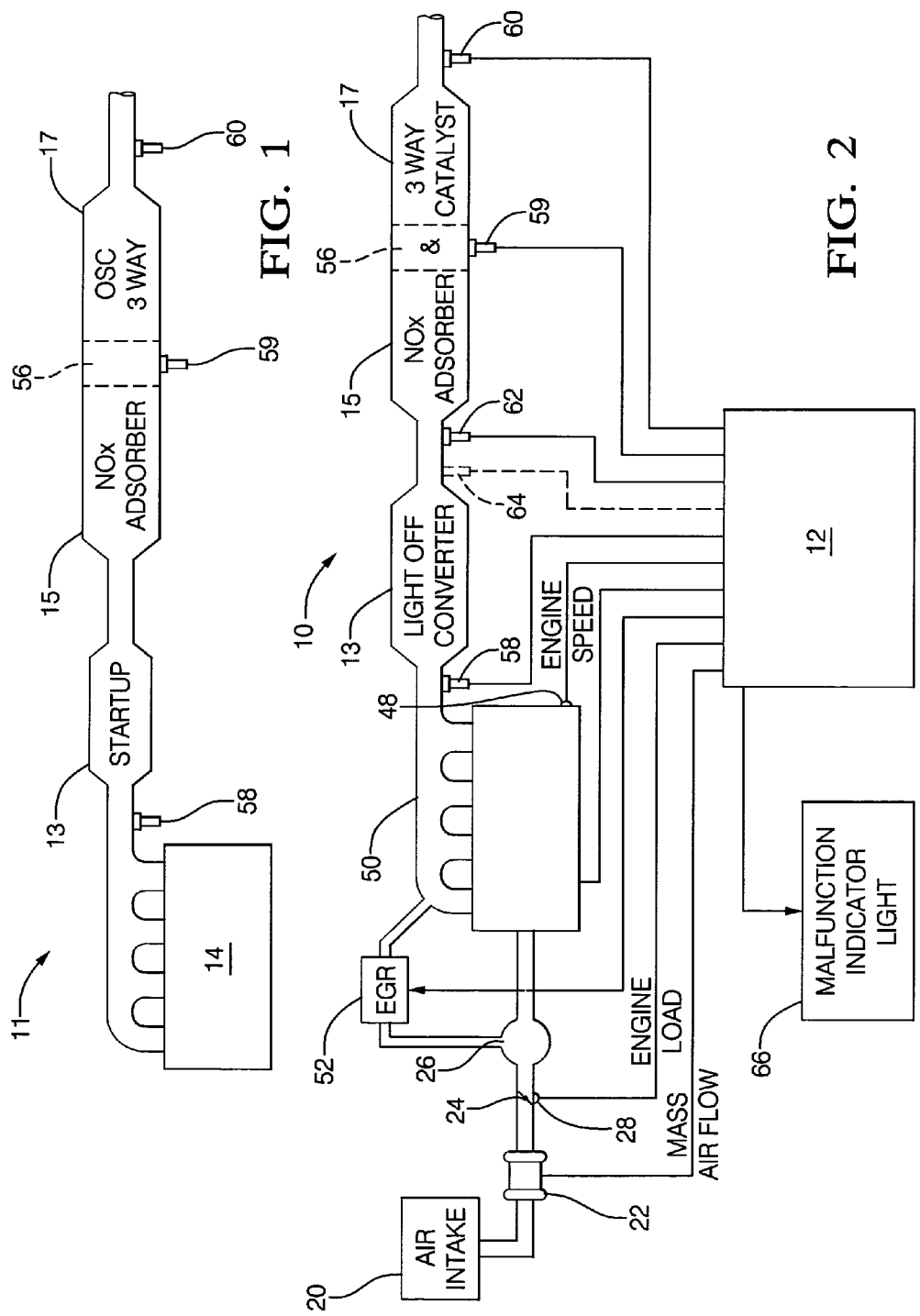

$NO_x$ ADSORBER DIAGNOSTICS AND AUTOMOTIVE EXHAUST CONTROL SYSTEM UTILIZING THE SAME

BACKGROUND

Automotive exhaust gas treatment devices have been used as original equipment by automotive manufacturers for many years as a way to reduce the hydrocarbon (HC), carbon monoxide (CO), and nitrogen oxide ($NO_x$) emissions from automotive internal combustion engines.

Some catalytic converters utilize a monolithic structure containing noble metals (e.g., platinum (Pt), palladium (Pd), rhodium (Rh), and/or the like) to provide catalytic afterburning of the engine emissions. More advanced systems utilize a three-way catalytic converter that is capable of simultaneously reducing the emissions of HC, CO. and NOx. To maximize the efficiency of these three-way converters, the engines are typically run at stoichiometry; that is, they are run at an air/fuel ratio in which the amount of air (oxygen) inducted into the cylinder is equivalent to the amount needed to burn all of the injected fuel. The stoichiometric air/fuel ratio is approximately 14.56. One problem with this mode of engine operation is that it is not always possible or desirable to operate the engine at stoichiometry. Rather, for purposes of maximizing fuel economy, it is often desirable to operate the engine in a lean combustion condition in which the amount of intake air is greater than is needed to burn the injected fuel.

Under lean-burn conditions, the air-to-fuel ratio is adjusted to be somewhat greater than the stoichiometric ratio (about 14.7 or greater), generally between about 19 and about 35, in order to realize a fuel economy benefit. However, when operating under lean-burn conditions, typical three-way catalyst systems are efficient in oxidizing unburned HC and CO, but are inefficient in reducing $NO_x$ emission. Conversely, during engine warm up and during periods of acceleration when torque is required, it is desirable for driveability to operate the engine in a rich combustion condition in which the amount of fuel injected is greater than the amount of fuel that the inducted air can burn. A rich combustion condition is one in which the air/fuel ratio is less than 14.56.

More recently, $NO_x$ adsorbers have been developed which store $NO_x$ during periods of lean engine combustion (i.e., excess air) and then periodically release the $NO_x$ during periods of rich combustion (i.e., excess fuel) so that the $NO_x$ can be catalytically reduced due to the presence of excess HC, CO, and $H_2$.

The amount of $NO_x$ that can be stored in a $NO_x$ adsorber during any one lean cycle is dependent upon the state, volume, and temperature of the $NO_x$ adsorber. A problem with $NO_x$ adsorbers is that, over time, the adsorbers can deteriorate due to, for example, poisoning from sulfur oxides ($SO_x$).

When the $NO_x$ adsorber has deteriorated to some extent, it needs to be regenerated by running the engine rich until the stored sulfur oxides are released. A common problem that remains unsolved, however, is that during the rich combustion conditions necessary for desulfurization of the $NO_x$ adsorber, the amount of HC and CO breakthrough (i.e., released from the system to the environment) increases.

Therefore, a need exists for a more effective system for desulfurization of the $NO_x$ adsorber; that is, for an exhaust system that enables improved desulfurization while decreasing HC and CO breakthrough. Additionally, there exists a need for a $NO_x$ adsorber diagnostic system that provides an accurate measure of the stored $NO_x$.

There also exists a need for an engine control system, which provides control of the amount of $NO_x$ supplied to the $NO_x$ adsorber between regenerations.

SUMMARY

Disclosed herein are exhaust control systems, processes for controlling an exhaust system, and processes for controlling emissions of hydrogen sulfide in an exhaust stream. In one embodiment, the process for controlling an exhaust system can comprise flowing exhaust gas from the engine past a first oxygen sensor, through a $NO_x$ adsorber, past a second oxygen sensor, through a catalyst and past a third oxygen sensor, wherein the first oxygen sensor, the second oxygen sensor, and the third oxygen sensor, are in operable communication with an electronic control module, and using a switching delay between the first oxygen sensor and the second oxygen sensor to determine a $NO_x$ value, wherein the $NO_x$ value is selected from the group consisting of a $NO_x$ regeneration time, a stored $NO_x$ amount, a $NO_x$ storage efficiency, and combinations comprising at least one of the foregoing $NO_x$ values. A desulfurization process can be initiated when the $NO_x$ value is less than or equal to a first selected value. During the desulfurization process, when the third oxygen sensor signals a condition rich of stoichiometry, oxygen can be provided to the catalyst.

In one embodiment, the exhaust system can comprise: a $NO_x$ adsorber, a first oxygen sensor located upstream of and in fluid communication with the $NO_x$ adsorber, a second oxygen sensor located downstream of and in fluid communication with the $NO_x$ adsorber, a catalyst located downstream of and in fluid communication with the second oxygen sensor, a third oxygen sensor located downstream of and in fluid communication with the catalyst, and a control module operably connected to the first oxygen sensor, the second oxygen sensor, and the third oxygen sensor. The control module can be capable of initiating a desulfurization process when information from the first oxygen sensor and/or the second oxygen sensor signals a $NO_x$ regeneration time that is less than a selected value, and can be capable of switching an exhaust entering the catalyst during a desulfurization process to a stoichiometric or a lean combustion condition when the third oxygen sensor signals a rich stoichiometry.

The above-described and other features are exemplified by the following figures and detailed description.

DRAWINGS

Referring now to the figures, which are exemplary embodiments, and wherein the like elements are numbered alike:

FIG. 1 is a partial schematic view of an embodiment of an automotive exhaust control system;

FIG. 2 is a partial diagrammatic view of another embodiment of an automotive exhaust control system, showing the exhaust control system integrated into a vehicle electronic control module that is used to control operation of the vehicle engine;

DETAILED DESCRIPTION

Figure 3:
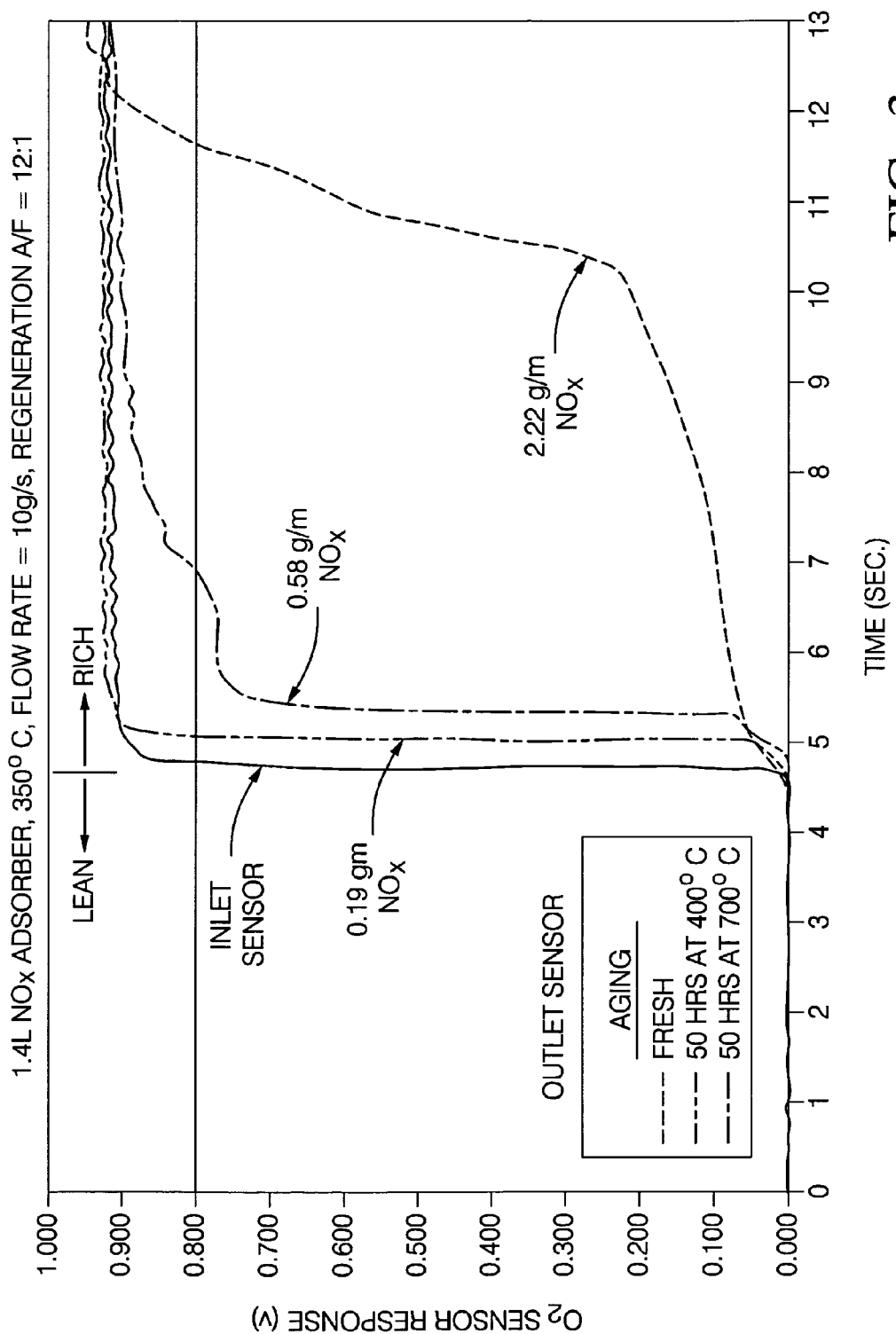
FIG. 3 is a graph showing the delay between switching of the upstream and downstream $O_2$ sensors at the beginning of the rich regeneration period for various amounts of stored $NO_x$ resulting from different agings of the $NO_x$ adsorber.

Disclosed herein are an exhaust control system and process for diagnosing the state of a $NO_x$ adsorber and for operating an internal combustion engine in a manner so as to minimize the emission of $NO_x$ from the $NO_x$ adsorber and preferably to provide effective control of $H_2S$ emission, and HC and CO breakthroughs during the $NO_x$ adsorber desulfurization process. The engine may be diesel, gas, or other fuel. It is noted that the terms "first," "second," and the like, herein do not denote any amount, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to 25 wt %, with 5 wt % to 20 wt % desired," are inclusive of the endpoints and all intermediate values of the ranges of "5 wt % to 25 wt %," etc.). Unless defined otherwise, technical and scientific terms used herein have the same meaning as is commonly understood by one of skill in the art to which this invention belongs. The modifier "about" used in connection with a quantity is inclusive of the stated value and has the meaning dictated by the context, (e.g., includes the degree of error associated with measurement of the particular quantity). The notation "±10%" means that the indicated measurement may be from an amount that is minus 10% to an amount that is plus 10% of the stated value.

In one embodiment, the engine is operated using a lean/rich cycle in which $NO_x$ stored by the $NO_x$ adsorber during the lean portion of the cycle is released and catalytically reduced during the rich regeneration portion of the cycle. Once the stored $NO_x$ has been released, the engine is switched back to lean for the start of another cycle. The system utilizes a first oxygen sensor (e.g., a switching oxygen sensor, wide-range air/fuel sensor, or the like) located upstream of the $NO_x$ adsorber and a second oxygen sensor located downstream of the $NO_x$ adsorber, preferably between the $NO_x$ adsorber and a down stream catalyst (e.g., a three-way catalyst, an oxidation catalyst, selective catalytic reduction catalyst, or the like), the $NO_x$ adsorber being in fluid communication with both the first and the second oxygen sensors.

The determination of the amount of $NO_x$ stored by the adsorber is based upon a realization that the delay in switching between the upstream and downstream oxygen sensors during the rich-to-lean transition is due to the storage of oxygen by the $NO_x$ adsorber at the beginning of the succeeding lean period, and that this delay can be used to estimate the amount of time that was required to release the stored oxygen during the lean-to-rich transition. Thus, the delay in switching between the upstream and downstream oxygen sensors at the end of the rich regeneration period (the $O_2$ storage time) is used as an indication of the amount of switching delay due to oxygen release during the lean-to-rich transition, and this $O_2$ storage time delay is subtracted from the total delay between switching of the sensors during the lean-to-rich transition (the combined $NO/O_2$ release time) to thereby obtain an accurate estimate of the amount of sensor switching delay due to the release of the $NO_x$ alone (the $NO_x$ release time). That is, the $NO_x$ release time ($NO_x$ regeneration time) is determined in part by the algorithm:

$NO_x$ release time=the combined $NO_x/O_2$ release time−$O_2$ release time, wherein the $O_2$ release time=the measured $O_2$ storage time.

Once the $NO_x$ release time is determined, the amount of $NO_x$ released by the adsorber during the rich regeneration can be determined and this amount can be taken as a good estimate of the amount of $NO_x$ that was stored during the previous lean period. In this way, the delay in switching of the sensors due to stored oxygen can be determined and eliminated from the $NO_x$ calculation without requiring separate lean/rich operating cycles.

Accordingly, an accurate estimate of the amount of $NO_x$ stored and released during a particular lean period can be determined using the following steps. First, the engine is run at a lean air/fuel ratio for a period of time and then is switched to a rich air/fuel ratio. The combined $NO_x/O_2$ release time is then determined based upon the amount of time between detection by the upstream oxygen sensor of a rich combustion condition and detection by the downstream oxygen sensor of the rich combustion condition. Next, the engine is switched back to operation at a lean air/fuel ratio and the oxygen storage time can be determined based upon the amount of time between detection by the upstream oxygen sensor of a lean combustion condition and detection by the downstream oxygen sensor of the lean combustion condition. Then, the $NO_x$ release time can be determined using the combined $NO_x/O_2$ release time and the oxygen storage time, e.g., by subtracting the oxygen storage time from the combined release time. Preferably, the $NO_x$ release time is used along with the exhaust flow rate and the magnitude of the air/fuel ratio during regeneration to determine the amount of $NO_x$ released (and therefore the amount stored during the previous lean period). Thereafter, operation of the engine at the lean air/fuel ratio is continued for a length of time that is dependent upon the calculated amount of $NO_x$ released.

This technique for determining the amount of $NO_x$ stored during the previous lean period (i.e., stored $NO_x$ amount) can be used as a part of an exhaust control system in which the stored $NO_x$ amount is used along with the exhaust gas temperature and other factors to determine the point at which the next rich regeneration will take place. This can be accomplished by using the stored $NO_x$ amount to determine a $NO_x$ storage limit that represents the amount of engine-out $NO_x$ that the adsorber is expected to be capable of handling at a particular efficiency. During the next lean period, the amount of engine-out $NO_x$ is then monitored and another rich regeneration is performed when the engine-out $NO_x$ reaches this $NO_x$ storage limit.

Also disclosed is a system for determining the storage efficiency of the $NO_x$ adsorber and controlling operation of the engine based upon the determined efficiency. The storage efficiency is determined using the amount of $NO_x$ stored during the previous lean period and the amount of engine-out $NO_x$ produced during that same period. The amount of stored $NO_x$ can be determined in the manner described above. The engine-out $NO_x$ can be determined in various manners using such factors as the air flow rate, engine load, engine speed, exhaust gas recirculation setting, spark advance, and the magnitude of the air/fuel ratio during the lean period. The $NO_x$ adsorber storage efficiency can then be used to determine the $NO_x$ storage limit that is utilized to determine the point at which the next rich regeneration should begin.

The $NO_x$ storage limit can be selected from values stored in memory and can be adjusted up or down depending upon whether the determined storage efficiency of the $NO_x$ adsorber is greater than or less than a desired efficiency. Then, when the amount of $NO_x$ stored falls below a selected threshold, a sulfur purge can be performed (thereby increasing the actual storage capacity) and, upon detecting that the storage efficiency has increased, the system can automatically respond by increasing the determined $NO_x$ storage limit that is used to determine how long the engine will be run lean each cycle. This provides closed loop control of the $NO_x$ emissions, allowing the system to utilize existing storage capacity in the $NO_x$ adsorber at any one time.

An abnormally short $NO_x$ regeneration time is indicative of a low $NO_x$ storage capacity in the adsorber. If this capacity drops below a certain level, it indicates that the adsorber may be severely sulfur-poisoned. Desulfurization can comprise:

1. When the post $NO_x$ adsorber, second oxygen sensor (and associated control module) signals a $NO_x$ adsorber regeneration time shorter than a preset threshold value, a desulfurization routine may be triggered.
2. Once a desired desulfurization temperature has been obtained (e.g., greater than or equal to about 650° C. at the $NO_x$ adsorber inlet), the engine can be switched to rich operation (A/F less than 14.56). Under these conditions, sulfur is released from the $NO_x$ adsorber in the form of $H_2S$ and $SO_2$. The rich operation can be terminated when the third oxygen sensor (downstream from the catalyst), signals a condition rich of stoichiometry. This process can take a significant period of time because of the high oxygen storage capacity of the catalyst (the higher the oxygen storage capacity, the longer the period of rich operation). During this long rich pulse, sulfur will continuously release from the $NO_x$ adsorber. Meanwhile, the stored oxygen will react with any excess HC and CO minimizing breakthrough of HC and CO at the tailpipe. The stored oxygen will also oxidize any $H_2S$ released from the adsorber to $SO_2$ thereby avoiding the undesirable release of $H_2S$ at the tailpipe. Hence, the third sensor facilitates diagnosis of the desulfurization process, and can help minimize HC, CO, and $H_2S$ slip from the tailpipe.
3. Because the complete desulfurization of the poisoned adsorber uses a prolonged period of rich operation, following the detection of the rich condition at the third oxygen sensor, the engine can be briefly switched to a stoichiometric or slightly lean operating condition to re-charge the storage capacity of the catalyst before engine operation is switched back to a rich condition allowing the desulfurization process to continue as before. Thereby inhibiting undesirable release of HC, CO, and/or $H_2S$.
4. By repeating steps 2 and 3 for a selected number of times, desulfurization of the $NO_x$ adsorber is ensured and, upon returning to a normal $NO_x$ adsorber operating temperature and typical conditions of lean/rich modulation, an acceptable $NO_x$ adsorber regeneration time will be signaled by the second oxygen sensor, confirming the restoration of an acceptable $NO_x$ storage capacity.

In addition to using the third oxygen sensor, oxygen (e.g., air) from an external source can be supplied to the catalyst. The external source of oxygen, which may be supplied by a pump, can create a lean condition downstream of the $NO_x$ adsorber. This external source and optionally the pump can be the source and/or pump optionally employed to supply oxygen upstream of the start-up catalyst during cold start. The pump may be activated by the second oxygen sensor when the air/fuel ratio is rich or the stoichiometric point or is richer than a selected value. Optionally, the pump can be used in conjunction with a directional valve to create a lean condition (by dilution with air) downstream of the $NO_x$ adsorber and/or sulfur trap (with or without a bypass). Therefore, the air pump can be triggered by the second oxygen sensor anytime the air/fuel ratio is indicated to be rich of the stoichiometric point, or richer than a certain selected value. A benefit of this mode of operation is that, anytime a desulfurization process is occurring, air could be added to the exhaust upstream of the trailing catalyst, thereby facilitating oxidation of $H_2S$, CO, and HC, and eliminating unwanted breakthrough of any of these components.

The catalyst, which preferably has a high oxygen storage capability, can be saturated with $O_2$ during the lean operation, such that the stored $O_2$ can be consumed during desulfurization. When all stored $O_2$ from the catalyst has been depleted, the HC and CO breakthrough will occur and $H_2S$ will likely be emitted. Therefore, signals from the third $O_2$ sensor will be used to trigger a lean operation to replenish the $O_2$ stored at the three-way catalyst before desulfurization is resumed. This will effectively reduce HC/CO and $H_2S$ breakthrough. The system will enable the engine control module to diagnose the effectiveness of the emission system, with an optional signal malfunction light in operable communication therewith to indicate if the NOx adsorber and/or the three-way catalyst has catastrophic failure.

The control module may initiate a desulfurization process when the second oxygen sensor signals a $NO_x$ regeneration time that is less than or equal to a selected value. The control module may also initiate the provision of oxygen to the catalyst from an external source, or switching to a lean operating condition to control HC and CO breakthrough. The $NO_x$ regeneration time is approximately equal to the $NO_x$ release time and is determined in part by an algorithm comprising: $NO_x$ release time=the combined $O_2$ and $NO_x$ release time–the $O_2$ release time.

The control module initiates alternating lean and rich operating conditions. $H_2S$, HC, and CO, released into the system, are oxidized by oxygen stored in the catalyst. A third oxygen sensor can be positioned downstream of the catalyst. The third oxygen sensor can be used to determine an amount of oxygen in the catalyst that has been depleted. Following the determination, the operation of the engine is switched to a stoichiometric or a lean combustion condition when the amount of oxygen that has been depleted is greater than or equal to a selected value.

Referring now to the drawings, and in particular to FIG. 1, there is shown an exemplary exhaust emission control system, generally shown as 11, including a disclosed $NO_x$ adsorber converter system. FIG. 1 depicts an embodiment of a vehicle exhaust control system 11 comprising, in sequence, an internal combustion engine 14; a first oxygen sensor 58;

a start-up catalyst (e.g., start-up catalyst and/or sulfur trap) 13; an exhaust emission control device 56 comprising a $NO_x$ adsorber 15, a second oxygen sensor 59, and a catalyst 17 (e.g., a three-way catalyst, oxidation catalyst, or the like), a third oxygen sensor 60 downstream of the catalyst 17, and optionally a temperature sensor 62 disposed upstream of the NOx adsorber and downstream of the light-off converter 54. Optionally additional exhaust emission control devices can be employed, such as a particulate filter and/or sulfur trap (e.g., disposed upstream of the $NO_x$ adsorber 15 and downstream of the start-up catalyst 13 (not shown)).

Referring now to FIG. 2, there is shown another embodiment of an exemplary exhaust control system designated generally as 10, that is integrated in with an automotive engine electronic control module (ECM) 12. Exhaust control system 10 is used in connection with an internal combustion engine 14 (e.g., gasoline, diesel, or the like) having an air inlet section and an exhaust system. In general, exhaust control system 10 monitors engine performance and exhaust output and controls engine operation in a manner that seeks to maximize engine performance and fuel economy, while minimizing emission of HC, CO, $NO_x$, and other contaminants.

The air inlet section includes an air intake 20 that is connected to an intake manifold (not shown) on engine 14 via a mass air flow sensor 22, throttle 24, and an exhaust gas recirculation (EGR) injection port 26. Air flow sensor 22 is used to provide electronic control module 12 with a signal indicative of the rate of air introduced into engine 14. The engine load is detected by a throttle position sensor 28 that is connected to throttle 24. The measured flow rate and engine load can be used along with other variables by the electronic control module 12 to determine the amount of $NO_x$ produced by the engine during each lean cycle, as will be discussed further below.

Electronic control module 12 can have any hardware design capable of performing the stated function of controlling the exhaust system, including a microprocessor (CPU), data, control, and address buses, digital to analog converters (D/A's), analog to digital converters (A/D's), a ROM, RAM, a battery-back up, otherwise non-volatile memory (NVM), a processor(s), computer(s), memory, storage, register(s), timing, interrupt(s), communication interface(s), and input/output signal interfaces, and the like, as well as combinations comprising at least one of the foregoing.

The exhaust system includes an exhaust manifold 50, EGR valve 52, light-off converter 54, exhaust emission control device 56, upstream $O_2$ sensor 58, downstream $O_2$ sensor 60, temperature sensor 62, and switching $O_2$ or wide-range air/fuel (WRAF) sensor 64 at the inlet of exhaust emission control device 56. Light-off converter 54 is located close to exhaust manifold 50 (e.g., close coupled) and is used to promote fast light-off so as to reduce emissions when the engine 14 is first started. Exhaust emission control device 56 is an integrated unit that includes both a $NO_x$ adsorber function and downstream function. However, separate units are also possible with the $O_2$ sensor 59 being disposed between the NOx adsorber and the catalytic converter. In the illustrated embodiment, the $NO_x$ adsorber can be incorporated into converter 56 as a separate catalyst brick (located upstream of the catalyst brick). $O_2$ sensor 58 will typically be a wide-range air/fuel sensor that may additionally be used for other emissions purposes, such as engine control. However, in addition to or in lieu of sensor 58, switching $O_2$ sensor 64 can be used. The downstream $O_2$ sensor 60 and $O_2$ sensor 59, can, individually, be switching $O_2$ sensors or WRAF sensors. The sensors (temperature and oxygen), are in operable (preferably electrical) communication with the electronic control module 12.

Various catalysts have been developed, including three-way catalysts, oxidation catalysts, selective catalytic reduction catalysts, and the like. Such catalysts typically employ one or more noble metals, such as platinum (Pt), palladium (Pd), and/or rhodium (Rh), as well as other metals, oxides, and the like, disposed on support such as cordierite, ceramics (e.g., alumina), metals (e.g., stainless steel), and the like. Other metals and metal oxides may also be included. Additional promoters such as rare earths, as well as alkaline-earth metals (such as barium (Ba) and the like) have been suggested to improve catalyst performance.

Referring now to FIG. 3, there is shown a graph depicting the delay between switching of an upstream, or inlet, sensor and a downstream, or outlet, sensor for different stored amounts of $NO_x$ resulting from different agings of the $NO_x$ adsorber. The data used to generate this graph was measured using a 1.4 liter $NO_x$ adsorber operating at a temperature of 350° C. with a flow rate of 10 grams/sec and regeneration air/fuel ratio of 12:1. As this graph indicates, the delay between the inlet sensor (shown as a solid line) and the outlet sensor (shown as a broken line) depends on the amount of $NO_x$ stored in the $NO_x$ adsorber.

Figure 4:
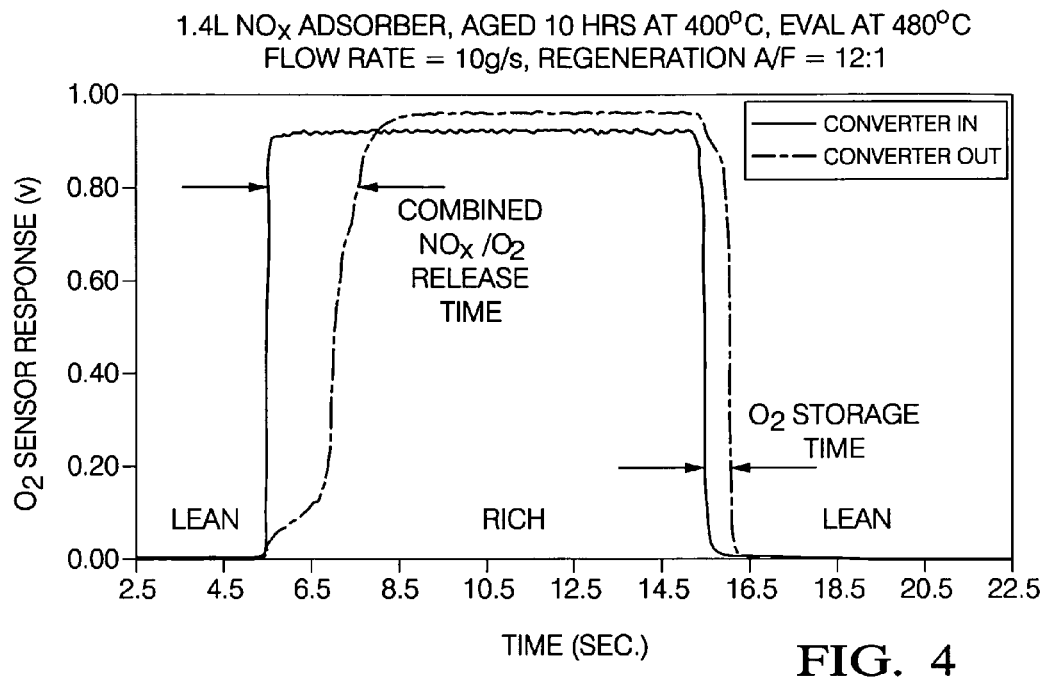
FIG. 4 is a graph showing the $O_2$ sensor switching delay due to the release of $NO_x$ and $O_2$ at the beginning of the rich regeneration period, and the $O_2$ sensor switching delay due to the storage of $O_2$ at the beginning of the succeeding lean period.

The delay between the upstream and downstream $O_2$ sensors at the beginning of the rich regeneration cycle includes a component that is due to the release of stored $NO_x$ and a component that is due to the release of stored $O_2$, and as shown in FIG. 4, this delay is therefore referred to herein as the combined $NO_x/O_2$ release time. To accurately determine the amount of $NO_x$ stored in the $NO_x$ adsorber, it is necessary to determine from this combined release time the amount of delay that is due to the $NO_x$ release alone. This can be accomplished by determining the amount of the combined release time that is due to oxygen release alone and then subtracting that time from the combined release time, as indicated by the following equation:

$$NO_x \text{ release time} = \text{the combined } NO_x/O_2 \text{ release time} - O_2 \text{ release time} \quad (1)$$

This $O_2$ release time can be estimated using the delay time between the upstream 64 and downstream 60 sensors during the rich-to-lean transition. More specifically and as shown in FIG. 4, the delay at the beginning of the succeeding lean period is due to the storage in the $NO_x$ adsorber of the excess oxygen coming from the engine. Upon switching to lean operation, the excess oxygen immediately causes the upstream $O_2$ sensor to indicate a lean combustion condition. However, this excess oxygen is stored in the $NO_x$ adsorber and is not detected by the downstream $O_2$ sensor until a short time later, after the $O_2$ storage capacity of the $NO_x$ adsorber has been exceeded. Assuming that the time required to store oxygen in the $NO_x$ adsorber is approximately equal to the time required to release the stored oxygen, this measurable delay at the beginning of the lean period provides a good estimate of the amount of the combined $NO_x/O_2$ release time that is due to release of the $O_2$ alone. Thus, the measured $O_2$ storage time can be substituted into equation (1) above for the $O_2$ release time to yield the following equation:

$$NO_x \text{ release time} = \text{the combined } NO_x/O_2 \text{ release time} - O_2 \text{ storage time} \quad (2)$$

The graph of FIG. 4 was generated using data measured with a 1.4 liter $NO_x$ adsorber that had been aged ten hours at 400° C. and that was running at a 480° C. bed temperature with a flow rate of 10 grams per second (g/s) and air/fuel (A/F) ratio of 12:1 during the rich regeneration. This graph illustrates the $O_2$ storage time and the $O_2$ release time.

Once the $NO_x$ release time has been determined, the amount of $NO_x$ released can be determined, this number can be used as an estimate of the total amount of $NO_x$ stored during the previous lean period. Preferably, the measured $O_2$ storage time is subtracted from the combined release time measured during the same regeneration cycle. However, as an alternative, the $O_2$ storage time from one cycle can be subtracted from the combined release time measured during the next rich regeneration cycle. Moreover, for a given temperature, flow rate, and rich air/fuel ratio, if the $O_2$ storage time does not vary significantly from one cycle to the next, then it can be measured only periodically for different temperatures and used to update tables or equations that represent the $O_2$ storage time as a function of temperature, flow rate, and rich air/fuel magnitude. These tables or equations could then be used along with the current temperature, flow rate, and commanded air/fuel ratios to obtain an $O_2$ storage time for use in determining the $NO_x$ release time according to equation (2). Whether using wide-range or switching sensors to determine the various delay times, it is necessary to determine the thresholds at which the sensor output will be considered indicative of the lean and rich combustion conditions. For example, in the graph shown in FIG. 4, the sensor outputs vary between zero and approximately one volt, with a lean combustion condition giving rise to a lower voltage and a rich condition giving rise to a higher voltage. If desired, a single intermediate voltage (such as 0.5 volts) could be used as the threshold for determining lean versus rich combustion, in which case any voltage less than 0.5 volts would be indicative of a lean combustion condition and any voltage above 0.5 volts indicative of a rich condition. Preferably, however, as indicated by the arrows in FIG. 4, values much closer to the limits of the sensor voltage are used as minimum thresholds for recognizing the engine operation as either being lean or rich. In particular, a rich combustion condition is only recognized when the sensor voltage equals or exceeds 0.8 volts and a lean condition is only recognized when the sensor voltage is less than or equal to 0.2 volts. Alternatively, one or both of these thresholds can be set at a certain percentage (e.g., 95%) of the full sensor voltage swing.

Figure 5:
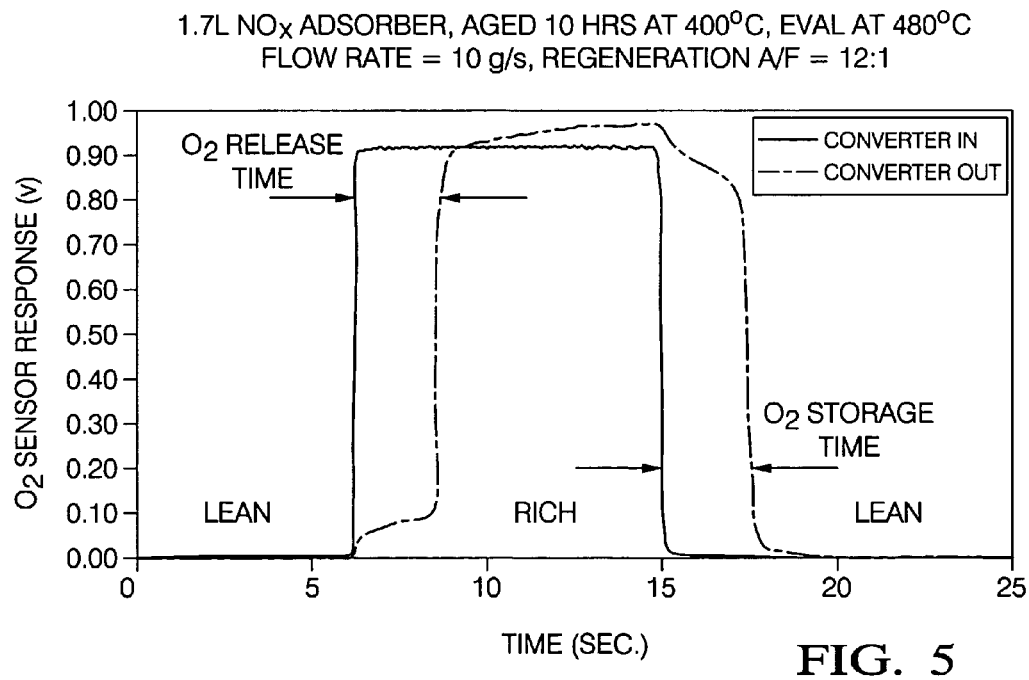
FIG. 5 is a graph showing the effect of release and storage of $O_2$ in the $NO_x$ adsorber on the delay between the upstream and downstream $O_2$ sensors.

The use of equation (2) assumes that the $O_2$ storage time provides a good estimation of the $O_2$ release time during the preceding and succeeding rich regeneration periods. As indicated in the graph of FIG. 5, the validity of this assumption has been empirically demonstrated. The data used for this graph was measured using a 1.7 liter $NO_x$ adsorber that had been aged ten hours at 400° C. and that was running at a 480° C. bed temperature with a flow rate of 10 grams/sec and air/fuel ratio of 12:1 during rich regeneration. The experiment was run such that very little $NO_x$ (0.18 grams) was stored by the $NO_x$ adsorber so that the effect of $O_2$ storage and release on the delay between the upstream and downstream sensors could be compared. As indicated in FIG. 5, the $O_2$ storage time is substantially the same as the time required to release the stored $O_2$ at the beginning of the rich regeneration period.

Figure 6:
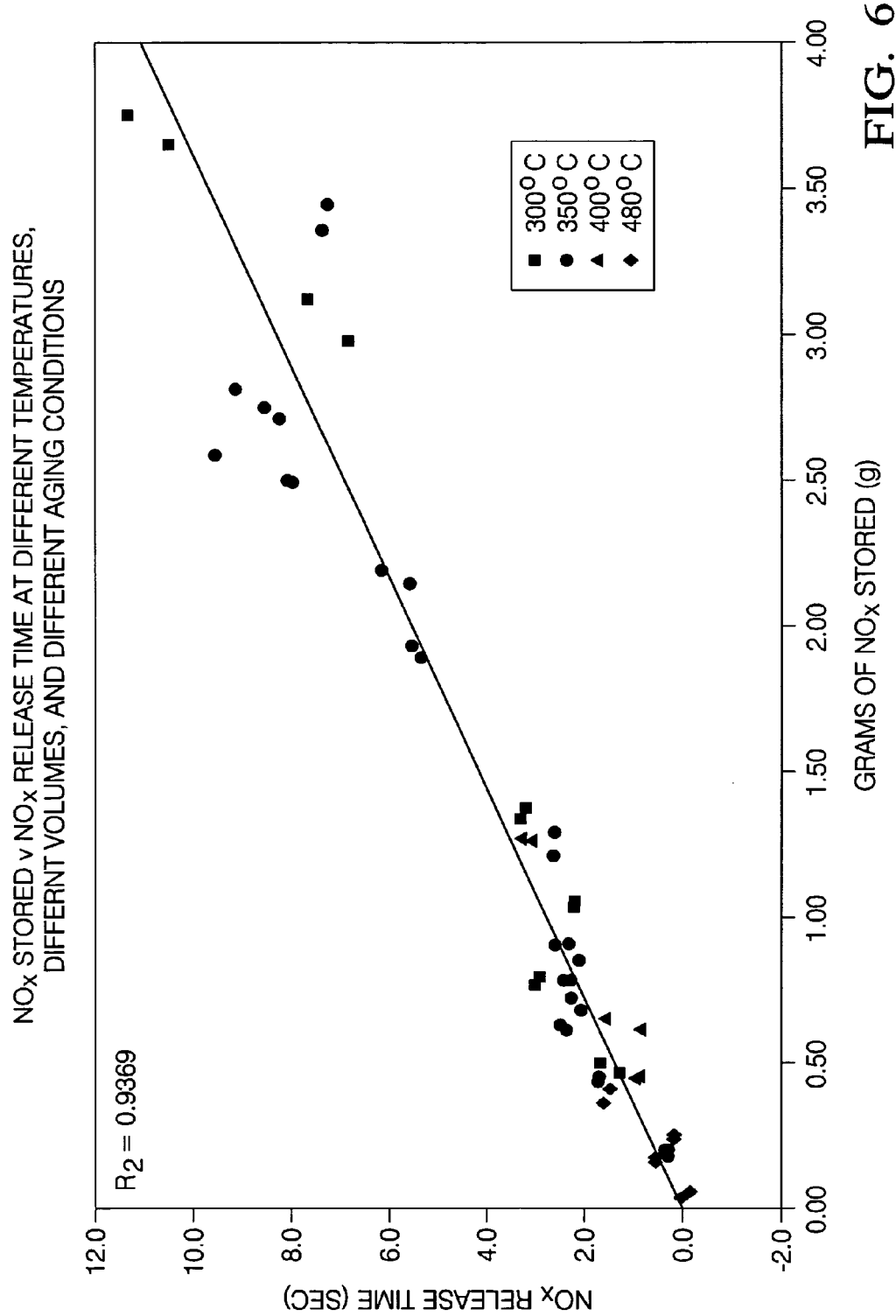
FIG. 6 is a graph showing the correlation between the calculated $NO_x$ release time and the actual grams of $NO_x$ stored for a typical $NO_x$ adsorber at differing temperatures.

Referring now to FIG. 6, it has also been empirically determined that there is good correlation between the $NO_x$ release time calculated according to equation (2) and the actual amount of $NO_x$ stored, and that this correlation is substantially independent of $NO_x$ adsorber aging, adsorber volume, and bed temperature during the regeneration. The data shown in the figure was collected at different temperatures for a particular $NO_x$ adsorber technology with the lean cycle and the rich regeneration being maintained at the same temperature. The data shown is for different volumes of the adsorber (1.4 L and 2.8 L) and after various aging conditions. The data shown resulted from tests performed on a fresh adsorber and after aging at 400° C. for 10, 30, and 50 hours. The data also shows the results of tests run on samples after aging at 1,000° C. for 10, 30, and 50 hours. While the amount of $NO_x$ stored is a strong function of the adsorber volume, the aging condition, and the temperature during the lean cycle, the relationship between the $NO_x$ release time and the amount of $NO_x$ stored is basically independent of these parameters. The experimental data shows that, over a wide range of temperatures, there is a fairly linear relationship between the amount of $NO_x$ stored in the $NO_x$ adsorber and the $NO_x$ release time calculated according to equation (2). Thus, while the temperature and state of the $NO_x$ adsorber can have a substantial impact on its storage capacity, the temperature and state of the $NO_x$ adsorber do not significantly affect the relationship between the amount of stored $NO_x$ and the delay between the upstream and downstream $O_2$ sensors. Similarly, it has been found that the relationship between the amount of stored $NO_x$ and this delay time is also substantially independent of $NO_x$ adsorber volume.

Figure 7:
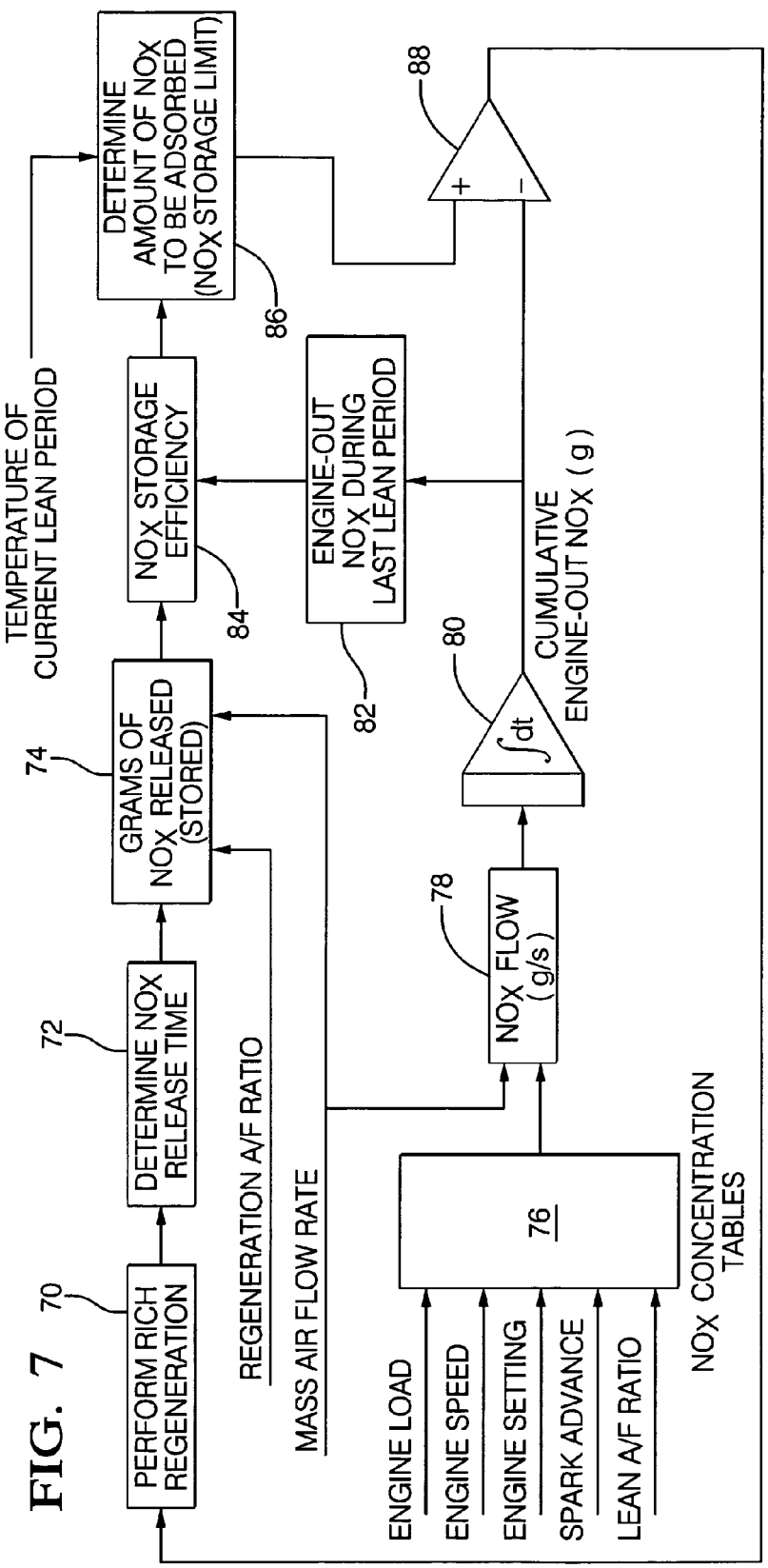
FIG. 7 is a process diagram depicting the operation of the exhaust control system of FIG. 2.

Referring next to FIG. 7, there is shown a process diagram that is used by engine electronic control module 12 of FIG. 2 to provide closed loop control of the amount of engine-out $NO_x$ produced during each lean/rich cycle of engine operation. This closed loop control allows the system to provide very high conversion levels. In general, the process involves determining the amount of $NO_x$ produced by the engine during a previous period of lean combustion, determining the amount of $NO_x$ adsorbed by the $NO_x$ adsorber during that lean period, determining the storage efficiency of the $NO_x$ adsorber, determining a $NO_x$ storage limit which represents the $NO_x$ storage capacity of the $NO_x$ adsorber at a particular level of storage efficiency, monitoring the amount of $NO_x$ produced by the engine during the next lean period, and initiating a rich regeneration when the amount of $NO_x$ produced by the engine reaches the $NO_x$ storage limit. The $NO_x$ storage limit is determined using temperature-dependent stored $NO_x$ values that are adjusted upwards if the measured storage efficiency is greater than a selected desired efficiency, adjusted downwards if the measured storage efficiency is less than the desired efficiency, and maintained if the measured efficiency is equal to the desired efficiency.

Beginning at block 70, upon completion of a rich regeneration, a new lean period is initiated and the $NO_x$ release time can be calculated using equation (2) along with the most recently measured combined $NO_x/O_2$ release time and $O_2$ storage time. This is indicated at block 72. Then, as shown by block 74, using the magnitude of the regeneration air/fuel ratio and the measured mass air flow during regeneration, the amount of $NO_x$ released (and therefore stored) by the $NO_x$ adsorber can be determined. This determination can be accomplished either using a look-up table or an equation that relates $NO_x$ release time to the amount of $NO_x$ released. At the same time, the system begins determining the cumulative engine-out $NO_x$ produced by the engine since the start of the new lean period. The determination of engine-out $NO_x$ can be accomplished using such parameters as the engine load, engine speed, EGR valve setting, spark advance, and the current lean air/fuel ratio. The first two of these are measurements use the throttle position sensor 28 and engine speed sensor 48, respectively (see FIG. 2). The last three of these are determined by engine electronic control module 12 as a part of separate engine operation processes, which are known to those skilled in the art. Using these parameters, the concentration of $NO_x$ in the engine emissions can be determined using equations or a table lookup, as indicated by block 76. Then, the determined $NO_x$ concentration can be combined with the measured mass air flow rate at block 78 to generate a $NO_x$ flow rate which, when integrated over time at block 80, provides an estimate of the total engine-out $NO_x$. Other similar techniques can be used to determine the amount of engine-out $NO_x$. See, for example, U.S. Pat. No. 5,437,153 to Takeshima, et al.

Moving now to block 84, the cumulative engine-out $NO_x$ stored during the last lean period is saved each cycle, as indicated at block 82, and is used along with the stored $NO_x$ amount determined at block 74 to calculate the storage efficiency of the $NO_x$ adsorber during that last lean period. This can be done using the following equation:

$$NO_x \text{ adsorber storage efficiency} = \frac{\text{stored } NO_x \text{ amount}}{\text{engine-out } NO_x} \quad (3)$$

Then, using the determined storage efficiency along with the measured temperature during the current lean period, the $NO_x$ storage limit for the current temperature is determined, as indicated at block 86. As will be understood from the description further below, this $NO_x$ storage limit is the maximum amount that the adsorber can store at a particular desired efficiency (e.g., at 90%). That is, although the $NO_x$ adsorber may be able to store more $NO_x$ than is represented by the determined $NO_x$ storage limit, it can only do so at a lower efficiency than is desirable. That would result in an undesirably large amount of $NO_x$ passing through the $NO_x$ adsorber and being emitted into the environment. Thus, the $NO_x$ storage limit represents the amount of $NO_x$ to be adsorbed during the current lean period. Once the $NO_x$ storage limit is determined, it is compared at block 88 to the cumulative engine-out $NO_x$ that is, of course, ever-increasing as the lean period progresses. Once the engine-out $NO_x$ reaches the $NO_x$ storage limit, engine operation is switched to rich to regenerate the $NO_x$ adsorber, as indicated back at block 70. The cycle then repeats.

Figure 8:
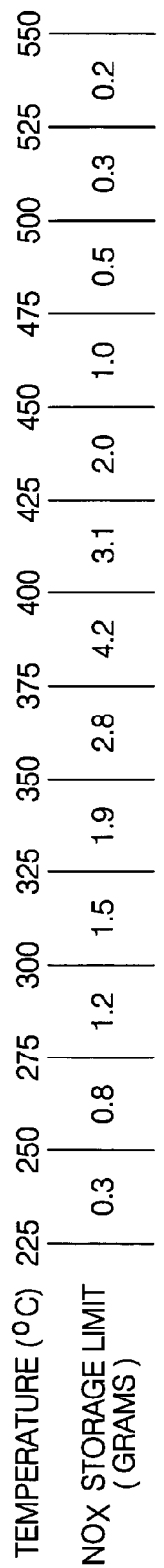
FIG. 8 is an exemplary $NO_x$ storage limit lookup table for use in the exhaust control system of FIG. 1 or FIG. 2.

The determination of the $NO_x$ storage limit can be accomplished by an equation or table lookup that provides a $NO_x$ value (in grams) representing the amount of engine-out $NO_x$ that the $NO_x$ adsorber is expected to be able to handle at the desired efficiency. This $NO_x$ value will be temperature dependent and, therefore, the temperature of the current lean period is used at this point so that the system can provide a $NO_x$ value that is appropriate for the current bed temperature. An exemplary lookup table is shown in FIG. 8. The spectrum of temperatures over which significant $NO_x$ adsorption is possible has been divided into a number of ranges. For each range, there is stored in non-volatile memory a $NO_x$ value that represents the grams of engine-out $NO_x$ that the $NO_x$ adsorber can handle at a particular storage efficiency. Determining the $NO_x$ storage limit then simply requires reading from memory the $NO_x$ value associated with the temperature range that spans the current temperature.

To provide negative feedback, the actual storage efficiency determined at block 84 is compared to the predetermined desired efficiency and, if the actual storage efficiency is greater, the $NO_x$ value produced by the equation or table lookup can be proportionally increased (e.g., by 5%), or, if the actual efficiency is less, the $NO_x$ value can be proportionally decreased (e.g., by 10%). That is, if the actual storage efficiency is found to be greater than the desired efficiency, then the $NO_x$ storage limit obtained using the equation or table lookup is in actuality too low (since it is based on an assumed lower efficiency) and needs to be increased. Conversely, if the storage efficiency is less than the desired efficiency, then the $NO_x$ storage limit is too high and should be decreased. If the efficiency equals the desired efficiency, then the $NO_x$ storage limits are maintained at the current levels. This will have the effect of either increasing, decreasing, or maintaining the length of the current lean period since the engine is operated lean until the amount of engine-out $NO_x$ equals that $NO_x$ limit.

Alternatively, stabilized closed loop control can be accomplished, not by simply adjusting the $NO_x$ value produced by the equation or table lookup, but by adjusting the equation parameters or the table values themselves. This adjustment can either be a percentage of the stored values (e.g., 5% or 10% as discussed above), or can be in the form of proportional error correction; that is, proportional to the difference between the determined storage efficiency and the desired storage efficiency. Moreover, the adjustment of the equation parameters or table values can be done according to temperature, either such that the $NO_x$ values at all temperatures are similarly adjusted, or so that the adjustment is more significant for certain temperature ranges than for others. For example, if the storage efficiency during the last lean period is below the desired level, a percentage decrease of 15% could be applied to the $NO_x$ storage amount in the temperatures of about 250° C. to about 275° C., while a percentage decrease of 12% could be applied to the $NO_x$ storage amount at about 275° C. to about 300° C. Also, rather than comparing the actual storage efficiency to a single predetermined desired efficiency, a window can be used, with the stored values of the $NO_x$ storage limit being used without adjustment up or down unless the actual efficiency is found to be outside this window. As will be apparent to those skilled in the art, by adjusting the $NO_x$ storage limit that is used to determine the length of the lean period, the system automatically adjusts to the current state of the $NO_x$ adsorber. This not only allows the system to reduce the lean period as the state of the $NO_x$ adsorber degenerates over time, but also allows the system to increase the lean period when the state of the $NO_x$ adsorber improves, such as after a sulfur purge.

Figure 9:
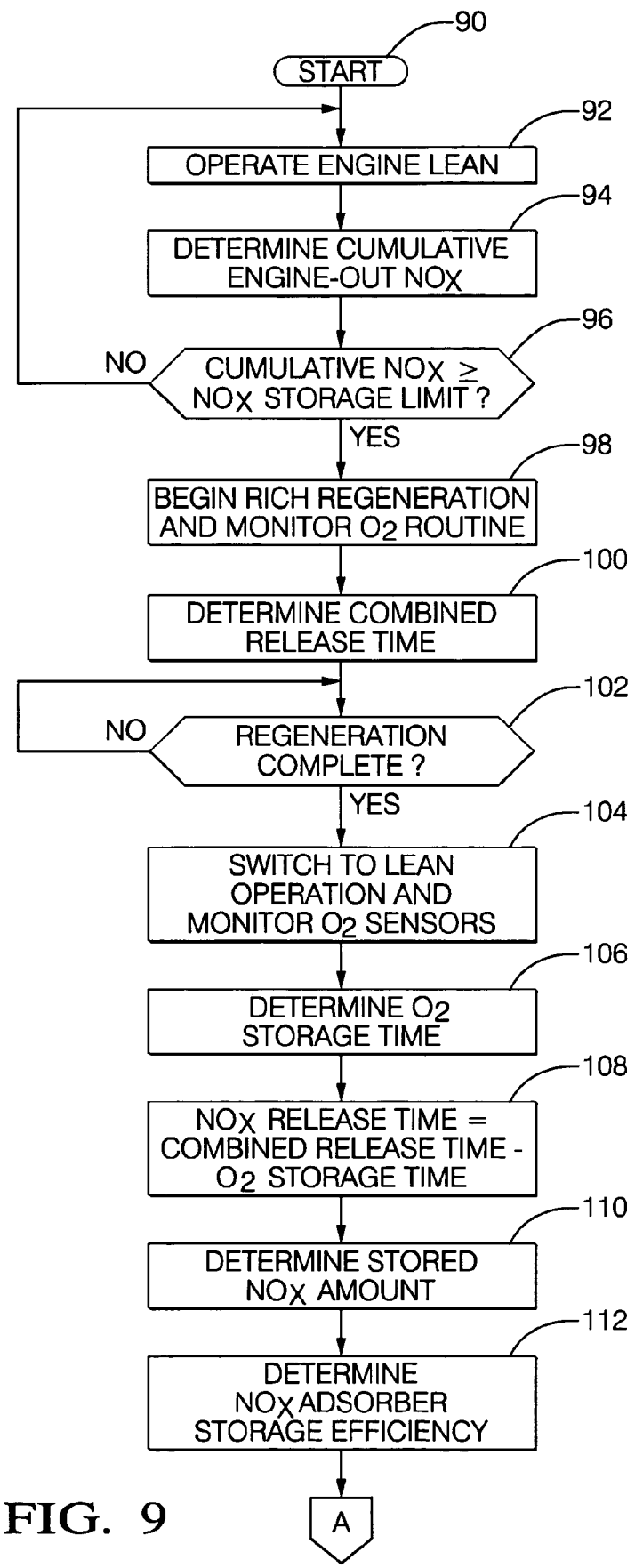
FIGS. 9 and 10 are flow charts that together depict the software process used in the exhaust control system of FIG. 2.
Figure 10:
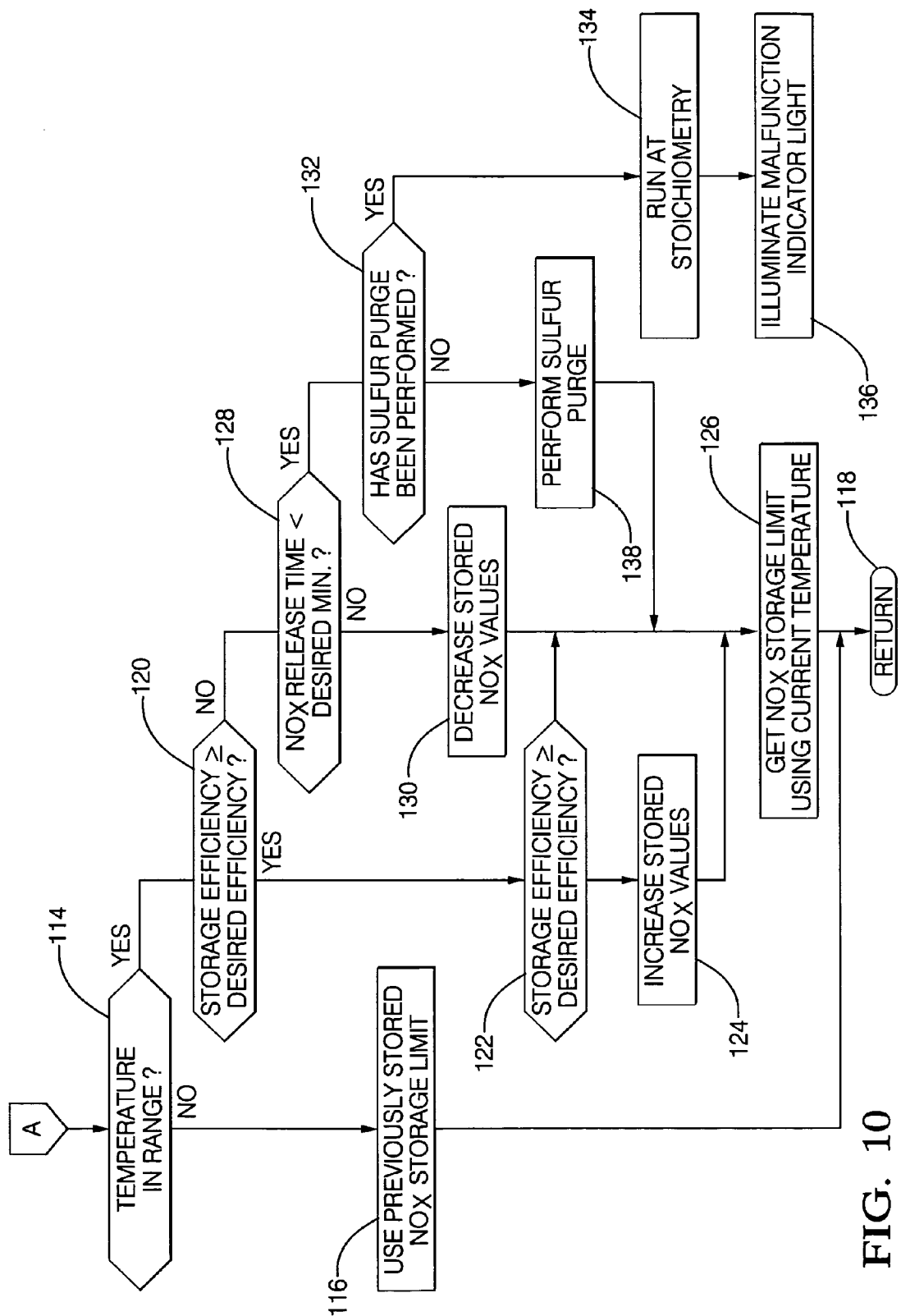

Turning now to FIGS. 9 and 10, there is shown a flow chart of the program used by electronic control module 12 to carry out the process of FIG. 7. This program can be stored in ROM and executed by a microprocessor either as a separate process or as part of an overall engine control algorithm. The process begins following start block 90 where the engine can be operated lean (block 92) during which time the engine-out $NO_x$ can be determined (block 94) and, as indicated at block 96, can then be compared with the $NO_x$ storage limit obtained using either an equation or table lookup. The first time through this loop, there will have been no calculated $NO_x$ storage efficiency from a previous iteration, so that the $NO_x$ value obtained from the equation or table lookup will not be adjusted up or down. If the cumulative amount of engine-out $NO_x$ for the current lean period is less than the $NO_x$ storage limit, then the $NO_x$ adsorber is still capable of $NO_x$ storage at or above the desired efficiency and the process returns to block 92 where the lean engine operation is continued. This loop repeats until the engine-out $NO_x$ equals or exceeds the $NO_x$ storage limit, at which point the process flow moves to block 98 where the rich regeneration is initiated. During the regeneration, the $O_2$ sensors are monitored and, at block 100, the combined $NO_x/O_2$ release time is determined once the downstream $O_2$ sensor switches fully to indicate that it sees a rich combustion condition. Then, at block 102, a check is made to determine if the regeneration is complete.

This check can be carried out by, for example, determining if the downstream $O_2$ sensor has reached a certain percentage (e.g., 95%) of the engine-out sensor's full-scale swing. If not, the process loops back on itself while regeneration continues. Once it is determined that the regeneration is complete, the process moves to block 104, where the engine operation is switched back to lean. The $O_2$ sensors are again monitored and, at block 106, the process determines the $O_2$ storage time, which, as discussed above in connection with FIG. 4, is the delay between switching of the sensors to the lean combustion condition.

Now that the combined $NO_x/O_2$ release time and the $O_2$ storage time have been determined, the $NO_x$ release time can be determined using equation (2), as indicated at block 108. The amount of $NO_x$ released (and, thus, the stored $NO_x$ amount) can then be determined at block 110 using the regeneration air/fuel ratio and air flow rate data discussed above in connection with FIG. 7. This determination can be made, for example, using a look-up table derived from FIG. 6 that relates the $NO_x$ release time, flow rate, and regeneration air/fuel ratio to the grams of $NO_x$ released. Next, the $NO_x$ adsorber storage efficiency is determined using equation (3), as indicated at block 112. Once the storage efficiency is determined, the process is ready to determine the next value of the $NO_x$ storage limit, which will be used to determine the amount of engine-out $NO_x$ permitted during the current lean period before regeneration is begun. Although this next value of the $NO_x$ storage limit can be found using equations or table lookups, in the process described below a table lookup will be assumed, with the table comprising $NO_x$ values at the desired efficiency for each of several different bed temperatures.

To determine the next value of the $NO_x$ storage limit, a check is first made at block 114 to determine if the $NO_x$ adsorber is within the range of temperatures suitable for $NO_x$ adsorption. If not, then a pre-selected $NO_x$ storage limit is used, as indicated at block 116, and current loop ends at block 118 with the process then returning to start block 90 for another iteration using the pre-selected $NO_x$ storage limit obtained at block 116. If, at block 114, the bed temperature is within range, the process moves to block 120 where a check is made to determine if the storage efficiency of the $NO_x$ adsorber is greater than or equal to the desired efficiency. If so, a check is made at block 122 to determine if the storage efficiency is actually greater than the desired efficiency. If it is, then the $NO_x$ values stored in the lookup table are increased, as indicated by block 124. Thereafter, the process moves to block 126 where the (now adjusted) $NO_x$ storage limit is obtained from the table using the current bed temperature. If at block 122, the storage efficiency had equaled the desired efficiency, then no adjustment of the $NO_x$ table values is needed and the process would move directly to block 126 to obtain the new $NO_x$ storage limit from the table. The process then moves to block 118 for another iteration.

If, back at block 120, the storage efficiency was determined to be less than the desired efficiency, then the process moves to block 128 where a check can be made to determine if the $NO_x$ release time calculated back at block 108 is less than a pre-selected desired minimum value. If so, this indicates that the state of the $NO_x$ adsorber has degenerated to a point at which a sulfur purge is needed, as will be discussed below. However, if the $NO_x$ release time is still above the pre-selected minimum acceptable value, then the process moves to block 130 where the $NO_x$ values stored in the lookup table are decreased, following which the process moves to block 126 and then to block 118 to perform another iteration. If, at block 128 it is determined that a sulfur purge is necessary, then the process moves to block 132 where a check is made to determine whether a sulfur purge has recently been performed. If so, this indicates that another sulfur purge will not adequately improve the state of the $NO_x$ adsorber and the process moves to block 134 where the engine is taken out of the lean/rich cycling and is run simply at stoichiometry. If desired, multiple sulfur purges can be performed prior to making a decision that a malfunction condition exists. Then, at block 136, the malfunction indicator light is illuminated to warn the driver of the abnormal engine operating condition. If, at block 132 no sulfur purge has recently been performed, the process moves to block 138 where a sulfur purge is carried out before moving to block 126 to obtain the next value of the $NO_x$ storage limit before beginning another iteration.

As will be appreciated, the storage efficiency will normally increase following the sulfur purge and this increase will be detected by the system, resulting in the stored $NO_x$ storage limit values being increased to take advantage of the greater $NO_x$ storage capacity resulting from the sulfur purge. An engine-out $NO_x$ amount representing the amount of $NO_x$ produced by the engine during a period of time may be determined; and the engine may be operated in a lean combustion condition for a duration of time that is dependent upon the stored $NO_x$ amount and the engine-out $NO_x$ amount. Alternatively, a $NO_x$ adsorber storage efficiency may be determined using the stored $NO_x$ amount and the engine-out $NO_x$ amount; and the engine may be operated in a lean combustion condition for a duration of time that is dependent upon the $NO_x$ adsorber storage efficiency.

Another alternative comprises determining a $NO_x$ storage limit for the $NO_x$ adsorber; determining an engine-out $NO_x$ amount while operating the engine at the lean combustion condition during the duration of time; and switching operation of the engine from the lean combustion condition to the rich combustion condition when the engine-out $NO_x$ equals or exceeds the $NO_x$ storage limit. The $NO_x$ storage limit represents the amount of $NO_x$ that can be stored by the $NO_x$ adsorber at one or more particular storage efficiencies.

The step of determining a $NO_x$ storage limit may further comprise: obtaining a value representing the $NO_x$ storage limit; increasing the value if the $NO_x$ adsorber storage efficiency is greater than a first selected efficiency; decreasing the value if the $NO_x$ adsorber storage efficiency is less than a second selected efficiency; and thereafter using the value as the $NO_x$ storage limit. According to one embodiment, the first selected efficiency and the second selected efficiency are each equal to the same or different pre-selected efficiency.

Yet another alternative comprises determining a $NO_x$ storage limit using the stored $NO_x$ amount; determining an engine-out $NO_x$ amount while operating the engine at the lean combustion condition during the period of time; and switching operation of the engine from the lean combustion condition to the rich combustion condition when the engine-out $NO_x$ equals or exceeds the $NO_x$ storage limit. During operation of the engine in the rich combustion condition, the engine is operated at an air/fuel ratio with the exhaust gases being exhausted from the engine at a measurable flow rate; and the step of determining a stored $NO_x$ amounts further comprises determining the stored $NO_x$ amount using values indicative of the $NO_x$ release time, the air/fuel ratio, and the flow rate. An embodiment of the process may further comprise the step of measuring the flow rate of air entering the engine and using the flow rate of the air to determine the measurable flow rate. The disclosed exhaust control system or process provides many advantages in addition to those pointed out above. For example, the system or process has advantages over a system wherein high levels of $H_2S$ scavengers are incorporated into a trailing catalyst. Because during rich desulfurization of the $NO_x$ adsorber, $H_2S$ concentrations are very high, efficient scavenging is not possible. The disclosed method can also be useful in bypass systems where the $NO_x$ adsorber is being protected from high temperature using a diverter valve. The disclosed method can also be employed for the desulfurization of a sulfur trap rather than a $NO_x$ adsorber.

One advantage of this new method is that desulfurization is accomplished by a sequence of alternating high temperature lean and rich operations instead of a single long rich operation. This alternation can take several minutes, a longer overall period than that of other strategies. Although the rich operation is terminated before adsorber desulfurization is completed, and is therefore repeated multiple times, this sequential desulfurization is reported to intrinsically generate less $H_2S$. Additionally, the use of a high OSC catalyst downstream of a $NO_x$ adsorber allows for a more effective desulfurization of the $NO_x$ adsorber by prolonging the rich desulfurization time without HC and CO breakthrough. The high OSC catalyst serves as a rechargeable oxygen reservoir for oxidizing the HC and CO. During a repetitive lean/rich desulfurization schedule, the achievement of a longer rich regeneration period results in less total time than is required in using a system wherein there is no downstream high OSC catalyst. When desulfurization yields HC and CO breakthroughs, the process must be restricted to minimum time and repeated more often. Furthermore, if $H_2S$ is released from the $NO_x$ adsorber, it will be transformed to $SO_2$ over the post high OSC catalyst. Also, the third oxygen sensor downstream of the catalyst will effectively utilize diagnostics strategies designed for detecting the completion of $NO_x$ regeneration and loss of $NO_x$ storage attributable to sulfur poisoning. Signals from the third oxygen sensor may be used in one embodiment to prevent HC and CO breakthroughs during the desulfurization. The trailing high OSC catalyst reduces the amount of HC, CO, and $NO_x$ breakthrough during rich pulses utilized for normal regeneration of the $NO_x$ adsorber; provides better system control at stoichiometry, and reduces $NO_x$ emissions at low temperature. Because the disclosed system, employing an air pump to assist in maintaining the high OSC catalyst, allows desulfurization to occur using a single prolonged rich excursion, the time required for the after-treatment system to be maintained at an elevated temperature is minimized. This in turn minimizes thermal damage of the catalytic components, while simultaneously minimizing the fuel economy penalty which is expected to be incurred by operating the engine in a mode which generates a high temperature in the sulfur-poisoned component, the high temperature being necessary for effective desulfurization.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for controlling an exhaust system for an internal combustion engine, comprising:

flowing exhaust gas from the engine past a first oxygen sensor, through a NOx adsorber, past a second oxygen sensor, through a catalyst and past a third oxygen sensor, wherein the first oxygen sensor, the second oxygen sensor, and the third oxygen sensor, are in operable communication with an electronic control module;

using a switching delay between the first oxygen sensor and the second oxygen sensor to determine a $NO_x$ value, wherein the $NO_x$ value is selected from the group consisting of a $NO_x$ regeneration time, a stored $NO_x$ amount, a $NO_x$ storage efficiency, and combinations comprising at least one of the foregoing $NO_x$ values; and initiating a desulfurization process when the $NO_x$ value is less than or equal to a first selected value, wherein the desulfurization process comprises increasing a temperature in the exhaust gas to a desulfurization temperature;

switching the engine operation from a normal combustion condition to a rich combustion condition to produce a rich exhaust gas;

monitoring the rich exhaust gas exiting the catalyst; and providing oxygen to the catalyst when, during the desulfurization process, the third oxygen sensor signals a third condition rich of stoichiometry.

2. The process of claim 1, wherein providing oxygen to the catalyst further comprises switching the engine operation to a stoichiometric or a lean combustion condition.

3. The process of claim 2, wherein the engine is switched to the stoichiometric or the lean combustion condition for a period of time sufficient to increase the amount of oxygen stored in the catalyst to a desired oxygen level.

4. The process of claim 1, wherein providing oxygen to the catalyst further comprises providing the oxygen from an external source to the exhaust gas downstream of the $NO_x$ adsorber.

5. The process of claim 1, wherein the switching delays comprise a first time delay between (the first oxygen sensor switching a first sensor first value to a first sensor second value) and (the second oxygen sensor switching from a second sensor first value to a second sensor second value); and a second time delay between (the first oxygen sensor switching from the first sensor second value to the first sensor first value) and (the second oxygen sensor switching from the second sensor second value to the second sensor first value).

6. The process of claim 1, wherein the desulfurization process further comprises repeating the switching the engine operation from a normal combustion condition to a rich combustion condition;

monitoring the exhaust gas exiting the catalyst; and providing oxygen to the catalyst when, during the desulfurization process, the third oxygen sensor signals a third condition rich of stoichiometry;

wherein the repeating continues until the $NO_x$ regeneration time is greater than or equal to a second selected value.

7. The process of claim 1, further comprising
operating the engine under lean combustion conditions to produce a lean exhaust gas at the normal operating temperature;
monitoring a first air/fuel ratio of the lean exhaust gas when passing the first oxygen sensor as a first sensor first value;
monitoring a second air/fuel ratio of the lean exhaust gas exiting the $NO_x$ adsorber with the second oxygen sensor as a second sensor first value;
operating the engine under rich combustion conditions to produce a rich exhaust gas;
monitoring the first oxygen sensor for a first sensor second value indicating a switch to the rich combustion conditions;
monitoring the second oxygen sensor for a second sensor second value indicating the switch to the rich combustion conditions;
determining a combined $NO_x/O_2$ release time that is related to an amount of time delay between (the first oxygen sensor switching from the first sensor first value to the first sensor second value) and (the second oxygen sensor switching from the second sensor first value to a second sensor second value);
switching the engine operation to the lean combustion condition;
determining an $O_2$ storage time that is related to an amount of time delay between (the first oxygen sensor switching a from the first sensor second value back to the first sensor first value) and (the second oxygen sensor switching from the second sensor second value back to the second sensor first value);
determining the $NO_x$ regeneration time using the combined $NO_x/O_2$ release time and the $O_2$ storage time;
determining a stored $NO_x$ amount and using the stored $NO_x$ amount to determine a $NO_x$ storage time and $NO_x$ storage efficiency;
determining whether the stored $NO_x$ amount is less than or equal to the first selected value;
when the stored $NO_x$ amount is less than or equal to the first selected value, initiating the desulfurization process; and
switching to the lean combustion conditions at the normal operating temperature when the desulfurization process is complete.

8. The process of claim 7, wherein the desulfurization process further comprises
switching to the lean combustion conditions at the desulfurizing temperature when the third oxygen sensor signals a rich stoichiometry;
switching back to the rich combustion conditions at the desulfurizing temperature when the third oxygen sensor signals a lean stoichiometry; and
repeating the switching to the lean combustion conditions at the desulfurizing temperature and the switching back to the rich combustion conditions at the desulfurizing temperature, until the NOx adsorber is desulfurized.

9. The process of claim 7, wherein the $NO_x$ regeneration time is determined in part by an algorithm comprising:
$NO_x$ regeneration time=the combined and $NO_x/O_2$ release time-the $O_2$ release time.

10. The process of claim 7, wherein providing oxygen to the catalyst further comprises providing the oxygen from an external source to the rich exhaust gas downstream of the $NO_x$ adsorber.

11. An exhaust system, comprising:
a $NO_x$ adsorber;
a first oxygen sensor located upstream of and in fluid communication with the $NO_x$ adsorber;
a second oxygen sensor located downstream of and in fluid communication with the $NO_x$ adsorber;
a catalyst located downstream of and in fluid communication with the second oxygen sensor;
a third oxygen sensor located downstream of and in fluid communication with the catalyst; and
a control module operably connected to the first oxygen sensor, the second oxygen sensor, and the third oxygen sensor;
wherein the control module is capable of initiating a desulfurization process when information from the first oxygen sensor and/or the second oxygen sensor signals a $NO_x$ regeneration time that is less than or equal to a first selected value; and
wherein the control module is capable of switching an exhaust entering the catalyst during a desulfurization process to a stoichiometric or a lean combustion condition when the third oxygen sensor signals a condition rich of stoichiometry.

12. The exhaust system of claim 11, further comprising a temperature sensor disposed upstream of and in fluid communication with the NOx adsorber, and in operable communication with the control module.

13. The exhaust system of claim 11, further comprising a pump capable of providing oxygen to the catalyst from an external source.

14. The exhaust system of claim 13, wherein the pump is capable of providing the oxygen to downstream of the $NO_x$ adsorber.

15. The exhaust system of claim 11, further comprising a start-up catalyst disposed upstream of the $NO_x$ adsorber.

16. The exhaust system of claim 11, further comprising a particulate filter disposed upstream of the $NO_x$ adsorber and downstream of the start-up catalyst.

* * * * *